United States Patent
McSweeney et al.

(10) Patent No.: US 12,360,666 B2
(45) Date of Patent: Jul. 15, 2025

(54) MICROSERVICES SERVER AND STORAGE RESOURCE CONTROLLER

(71) Applicant: Dell Products L.P., Round Rock, TX (US)

(72) Inventors: Paul McSweeney, Silversprings (IE); Fearghal O'Maolcatha, Middleton (IE); Elaine Holland, Crookstown (IE)

(73) Assignee: Dell Products L.P., Round Rock, TX (US)

( * ) Notice: Subject to any disclaimer, the term of this patent is extended or adjusted under 35 U.S.C. 154(b) by 663 days.

(21) Appl. No.: 17/585,811

(22) Filed: Jan. 27, 2022

(65) Prior Publication Data

US 2023/0236724 A1 Jul. 27, 2023

(51) Int. Cl.
*G06F 3/06* (2006.01)
*G06F 9/50* (2006.01)

(52) U.S. Cl.
CPC .......... *G06F 3/0604* (2013.01); *G06F 3/0653* (2013.01); *G06F 9/5011* (2013.01); *G06F 9/5072* (2013.01); *G06F 2209/5019* (2013.01)

(58) Field of Classification Search
CPC .... G06F 3/0604; G06F 3/0653; G06F 9/5011; G06F 9/5072; G06F 2209/5019; G06F 3/0658; G06F 3/067; G06F 3/0683
See application file for complete search history.

(56) References Cited

U.S. PATENT DOCUMENTS

| | | | | |
|---|---|---|---|---|
| 2003/0158998 A1* | 8/2003 | Smith | ..................... | G06F 3/067 711/112 |
| 2005/0132127 A1* | 6/2005 | Chung | ............... | G06F 12/0246 711/E12.008 |
| 2007/0079170 A1* | 4/2007 | Zimmer | ............... | G06F 11/008 714/6.23 |
| 2010/0103818 A1* | 4/2010 | Griffith | ............... | H04L 65/1104 370/235 |
| 2011/0029981 A1* | 2/2011 | Jaisinghani | ........... | H04L 41/344 718/100 |
| 2011/0271283 A1* | 11/2011 | Bell, Jr. | ................ | G06F 9/5094 718/102 |
| 2012/0198462 A1* | 8/2012 | Cham | ................... | G06F 9/5038 718/103 |
| 2013/0046892 A1* | 2/2013 | Otani | ..................... | G06F 9/455 709/226 |
| 2013/0073914 A1* | 3/2013 | Kaul | .................... | G06F 12/0253 711/170 |
| 2013/0251371 A1* | 9/2013 | Goodson | ................ | H04B 10/27 398/66 |
| 2015/0112966 A1* | 4/2015 | Tokuda | ............. | G06F 16/24549 707/718 |
| 2016/0057034 A1* | 2/2016 | Rosier | ................. | H04L 41/0631 709/224 |
| 2016/0306673 A1* | 10/2016 | You | ........................ | G06F 9/5044 |

(Continued)

*Primary Examiner* — Tuan C Dao
(74) *Attorney, Agent, or Firm* — Krishnendu Gupta; Holly Vigliatura

(57) ABSTRACT

Aspects of the present disclosure relate to controlling resource consumption of a server and storage array. In embodiments, a request can be received by a server that is communicatively coupled to a storage array. Further, the services required to process the request can be identified. Additionally, services' activation can be controlled based on a mapping of request-related actions and initiated services.

20 Claims, 5 Drawing Sheets

(56) References Cited

U.S. PATENT DOCUMENTS

| | | | |
|---|---|---|---|
| 2017/0061342 A1* | 3/2017 | LoRe | G06Q 10/06393 |
| 2018/0270211 A1* | 9/2018 | O'Kennedy | H04L 63/0823 |
| 2019/0149436 A1* | 5/2019 | Park | H04L 47/788 |
| | | | 709/226 |
| 2019/0215256 A1* | 7/2019 | Dhanabalan | H04L 43/0876 |
| 2019/0347418 A1* | 11/2019 | Strogov | G06F 21/44 |
| 2020/0004701 A1* | 1/2020 | Subbarao | G06F 11/1068 |
| 2020/0178167 A1* | 6/2020 | Jia | H04W 8/08 |
| 2021/0272431 A1* | 9/2021 | Chavady | G08B 13/1966 |
| 2021/0342785 A1* | 11/2021 | Mann | G06F 40/186 |
| 2024/0394088 A1* | 11/2024 | Kelly | G06F 9/45558 |

\* cited by examiner

MICROSERVICES SERVER AND STORAGE RESOURCE CONTROLLER

BACKGROUND

Because a company can generate vast amounts of data, it can use a storage array to store the data. For example, a storage array is a data storage system used for block-based storage, file-based storage, or object storage. Additionally, the company can use a data server (e.g., a database server) that delivers services necessary to support one or more database management systems. These services include tasks like storing, archiving, processing, analyzing, and ensuring security for data. The data server can also ensure data is accessible for authorized clients, e.g., the database's client/server architecture.

SUMMARY

Aspects of the present disclosure relate to controlling resource consumption of a server and storage array. In embodiments, a request can be received by a server that is communicatively coupled to a storage array. Further, the services required to process the request can be identified. Additionally, activation of the services can be controlled based on a mapping of request-related actions and initiated services.

In embodiments, a resource mapping can be generated by defining relationships between the request-related actions and the services initiated to process the request-related actions.

In embodiments, telemetric data from the server and storage array can be collected in response to receiving the request. Additionally, the collected telemetric data can be analyzed.

In embodiments, the consumption and use of one or more of the server and storage array resources to process the request can be monitored using the collected telemetric data.

In embodiments, one or more of the server and storage array resource consumptions can be compared to a threshold.

In embodiments, one or more of the initiated services can be determined to include grouped services. Further, each service in a grouped service can be activated by default if any service of the group services is initiated.

In embodiments, a determination can be made as to whether each service of the grouped services is necessary to process the request-related actions.

In embodiments, the grouped services can be logically decoupled.

In embodiments, service consumption models can be generated using the server and storage array resource mappings.

Service initiation can be controlled based on the service consumption models and the resource mappings in embodiments. Further, the control of service initiation can include activating or suspending one or more services of one or more grouped services.

DETAILED DESCRIPTION

A business like a financial or technology corporation can produce a large amount of data. Thus, the business can also require storing the data, managing user or application access, and sharing the data. As such, a business can use storage arrays that deliver block-based storage, file-based storage, or object storage.

Generally, a third-party vendor (e.g., a cloud services provider) can deliver the business data storage solutions. The data storage solutions can include a storage array and data server that support a database management system. Specifically, the business can use the database management system to manage its data storage services. These services include tasks like storing, archiving, processing, analyzing, and ensuring security for data. Further, the third-party storage solution can preconfigure the storage solution with grouped (e.g., linked) tasks, which the solution executes in response to receiving an input/output (IO) request. However, the IO request may not require the storage solution to initiate/run each grouped task to yield a satisfactory response.

For example, the business can develop a proprietary microservice that interacts with the third-party storage solution. Specifically, the microservice can be designed to interact with a single storage service/task. Accordingly, each grouped task's execution results in wasted storage resource consumption and increased storage service latencies. Thus, the storage solution may not satisfy a business's performance requirements, compounded when the storage solution receives high-bandwidth resource-intensive workloads.

Embodiments of the present disclosure can logically decouple grouped services to suspend or activate individual services in the group as disclosed in greater detail herein.

Figure 1:
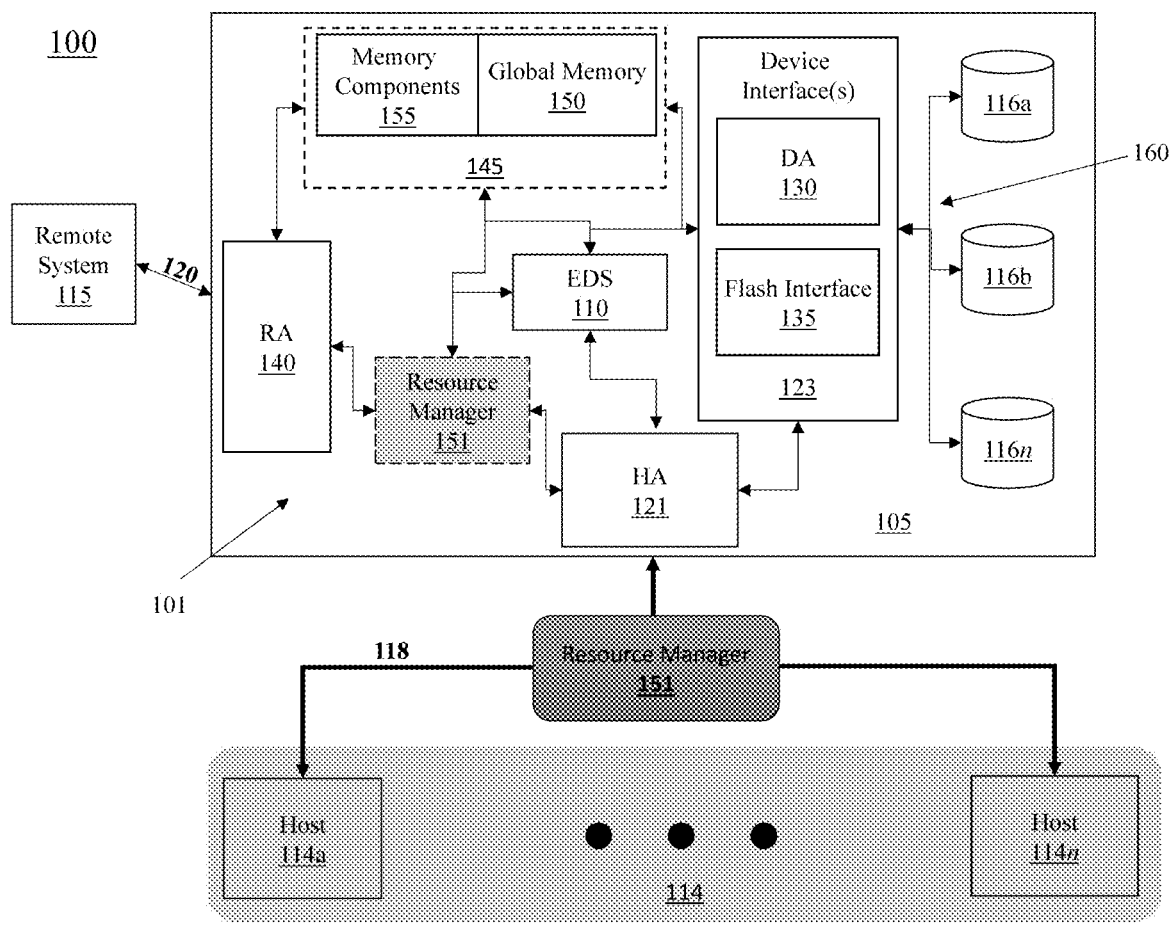
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, the array 105 and host systems 114a-n can define a first communication network 118. Further, the first network's topology can have the hosts 114a-n and the array 105 physically co-located or remotely located from one another. Likewise, the array 105 and a remote system 115 can define a second communication network 120. Additionally, the array's RA 140 can manage communications between the array 105 and an external storage system (e.g., remote system 115) using the networks 118, 120. The networks 118,120 can be a wide area network (WAN) (e.g., Internet), local area network (LAN), intranet, Storage Area Network (SAN)), Explicit Congestion Notification (ECN) Enabled Ethernet network and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The networked devices 105, 115a-n, 116, and the like can connect to the networks 118,120 via a wired/wireless network connection interface, bus, data link, and the like. Further, the networks 118/120 can also include communication nodes that enable the networked devices to establish communication sessions. For example, communication nodes can include switching equipment, phone lines, repeaters, multiplexers, satellites, and the like.

In embodiments, the array's components 101 can receive and process input/output (IO) workloads. An IO workload can include one or more IO requests (e.g., read/write requests or other storage service-related operations) originating from the hosts 114a-n or remote system 115. For example, one or more hosts 114a-n can run an application that requires a read/write of data from/to the array 105.

In embodiments, the array 105 and remote system 115, and their respective components, can include a variety of proprietary or commercially available single or multi-processor systems (e.g., an Intel-based processor and the like). For example, the array's components 101 (e.g., HA 121, RA 140, device interface 123, and the like) can include physical/virtual computing resources (e.g., a processor and memory) or require access to the array's resources. Further, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to an array component 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. The primary memory can include dynamic (RAM) and the like in embodiments, while cache memory can comprise static RAM, amongst other similar memory types. Like the array's storage devices 116a-n, the array's memory 145 can have different storage performance capabilities.

In embodiments, a service level agreement (SLA) can define at least one Service Level Objective (SLO) the hosts 114a-n require the array 105 to satisfy. For example, the hosts 115a-n can include host-operated applications that generate or require data. Moreover, the data can correspond to distinct data categories, and thus, each SLO can specify a service level (SL) for each category. Further, each SL can define a storage performance requirement (e.g., a response time and uptime).

Figure 1A:
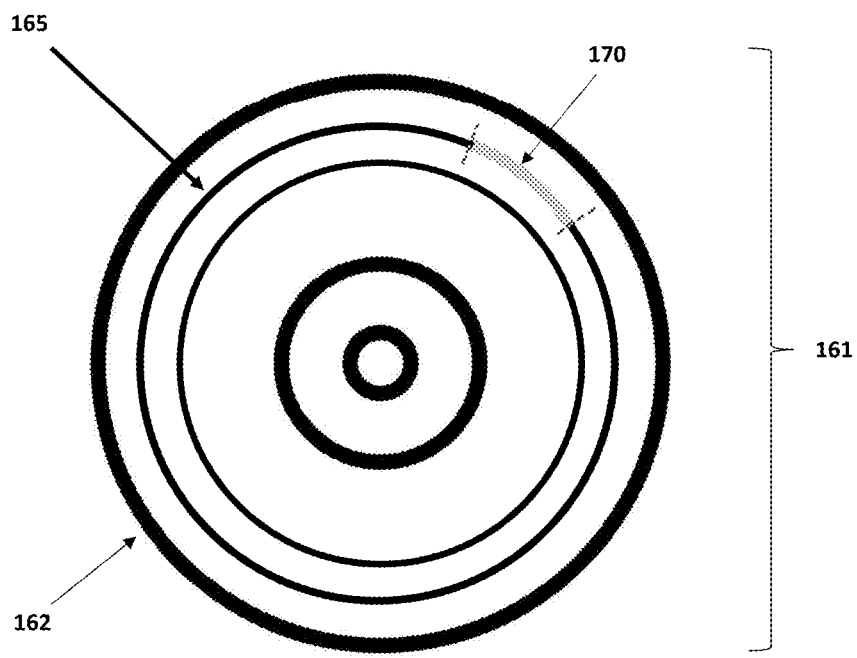
FIG. 1A is a cross-sectional view of a storage device in accordance with embodiments of the present disclosure.

Regarding FIG. 1A, the array 105 can persistently store data on one of its storage devices 116a-n. For example, one of the array's storage devices 116a-n can include an HDD 161 having stacks of cylinders 162. Further, a cylinder 162, like a vinyl record's grooves, can include one or more tracks 165. Thus, the storage array 105 can store data on one or more portions of a disk's tracks 165.

In embodiments, the HA 121 can expose and provide each host 114a-n logical unit number (LUN), defining a virtual storage volume. The virtual storage volume (VSV) can logically represent portions of at least one physical storage device 116a-n. For example, the EDS 110 can define at least one logical block address (LBA) representing a segmented portion of a disk's track 165 (e.g., a disk's sector 170). Further, the EDS 110 can establish a logical track or track identifier (TID) by grouping together one or more sets of LBAs. Thus, the EDS 110 can define a LUN using at least one TID. In addition, the EDS 110 can create a searchable data structure, mapping logical storage representations to their corresponding physical locations. Accordingly, the HA 121 can direct IO requests using the request's LUN and TID metadata fields and the data structure.

In embodiments, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the hosts 114a-n can require one or more of the array's storage services. In such circumstances, the hosts 114a-n can issue an IO request for the storage services to a resource manager 151. The resource manager 151 can include a universal interface that allows any authorized device, regardless of its operating system, to access the array 105. Further, the resource manager 151 can reside within the storage array 105 or an external device that is communicatively coupled to the storage array 105 (e.g., the network 118). Additionally, the manager 151 can deliver devices (e.g., hosts 114a-n) array and resource management services. Further, the array and management services can include connection utilities, command-line interfaces, and service-specific API endpoints, as described in greater detail below.

Figure 2:
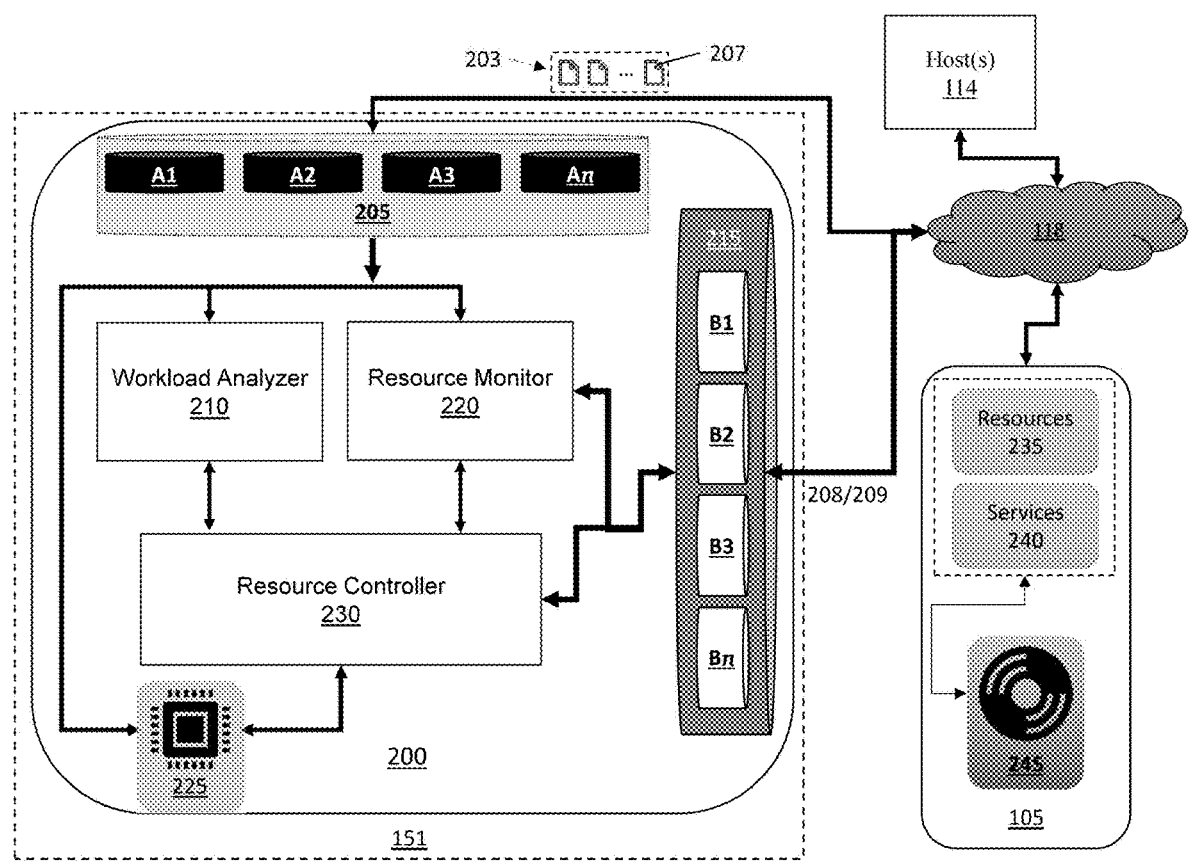
FIG. 2 is a block diagram of a resource manager in accordance with embodiments of the present disclosure.

Regarding FIG. 2, a resource manager 151 can include logic/circuitry element(s) 200 that manage an array's resources 235 and services 240. For example, host(s) 114 can collectively direct an IO workload 203 to the array 105. The workload 203 can include one or more IO requests 207, requiring at least one of the array's storage resources 235 or services 240.

In embodiments, the resource manager 151 can manage the resources 235 and services 240 based on the IO request 207 or workload 203 and their respective metadata. For example, the manager 151 can identify the service(s) required to process the IO request 207. Then, based on the required service(s), the manager 151 can issue the array 105 a control signal 208. The control signal 208 can include service activation/deactivation and resource allocation commands the array 105 uses to process the IO request 207.

In embodiments, the manager 151 can include a workload analyzer 210 with logic/circuitry that analyzes the IO workload 203 and each IO request 207. For example, the analyzer can identify the workload's and request's respective IO characteristics. Specifically, each IO request 207 can include metadata including IO information including, but not limited to, IO type, target data track, time, performance requirements, telemetry data, storage services, and the like. Further, the analyzer 210 can have machine learning (ML) logic/circuitry ("ML engine") designed to identify data patterns. For instance, the ML engine can form a neural learning network that ingests IO workloads and their IO requests to identify IO patterns. The ML engine can also identify relationships between IO requests within the workload 203 and other historical, current, or future IO workloads. Using the IO characteristics and IO workload/request patterns, the analyzer 210 can generate predictive IO workload models and store them in the resource manager's local memory 225. The IO workload models can define future workloads' IO characteristics and their respective requests' IO characteristics.

Further, the resource manager 151 can include a resource monitor 220 that collects and analyzes the services, processing threads, resources, and the like the array 105 uses to process the IO workload 203 and its IO requests 207. In embodiments, the monitor 220 can manage one or more daemons 245 communicatively coupled to the arrays resources 235 and services 240 (e.g., processing threads) using a daemon control signal 209. For example, the daemons 245 can record their respective resource's or service's activity in their respective activity logs. Each record can include IO/storage-related information such as device characteristics such as IO/data type, size, storage/memory slot size, storage performance, SL requirement, and telemetry data, amongst other event-related metadata. The storage performance can correspond to the array's response time to service each IO request 207.

Further, the monitor 220 can generate at least one snapshot by periodically analyzing each daemon's activity log. Specifically, the daemon control signal 209 can include a daemon reporting schedule that defines the duration, start time, and end time of each daemon's event collection period. For example, the monitor 220 can establish the reporting schedules based on the analyzer's identified historical, current, future workload patterns and the resources/services activity levels logged by the daemons 245.

In addition, the monitor 220 can generate resources/services heatmap(s) using the snapshot(s). Each heatmap can specify each resource's and service's activity levels during a snapshot window (e.g., the corresponding snapshot's event collection period). Further, the monitor 220 can include logic/circuitry with a neural learning network architecture that ingests the heatmaps to identify activity level patterns. Using the activity level patterns, the monitor 220 can generate predictive resources/services activity models, specifying future workload/IO-related activity levels. Further, the monitor 220 can identify the resources/services 235/240 having the highest and lowest relative activity levels during each snapshot window. Thus, the monitor 220 can define each heatmap's activity level range from the storage resource portions having the highest and lowest relative activity levels. Further, the monitor 220 can establish activity level threshold(s) based on each heatmap's activity level range and heatmap patterns' ranges. For example, the monitor 220 can define an activity level as 'hot' if it exceeds a first threshold and 'cold' if below a second threshold.

In embodiments, the resource manager 151 can include a resource controller 230 that controls the array's resources/services 235/240 utilization based on workload/IO characteristics, the IO workload models, resource/services activity models, and the like. For example, the controller 230 can correlate historical, current, and predicted IO workloads with corresponding historical, current, and predicted activity levels using the workload and activity level models. Additionally, the controller 230 can append each resource/service 235/240 listed in the activity model(s) with relative importance levels. For example, the controller 230 can use the heatmap(s) to establish each resource's or service's relative importance level. In addition, the controller 230 can define each resource's or service's relative importance level based on their respective types (e.g., core service or not). For instance, the controller 230 can define an operating system level service as very important regardless of its activity level because the array 105 may require it to remain operational.

In embodiments, the controller 230 can establish resources/services allocation model(s) using the defined resources/services relative importance(s), IO workload model(s), and activity level model(s). The resources/services allocation model(s) can specify policies (e.g., instructions) the controller 230 can manage the array's use of resources/services. For example, the controller 230 can identify the array's preconfigured grouped resources/services 235/240 using the activity level patterns identified by the resource monitor 220. Specifically, the controller 230 can identify a set of resources/services 234/240 as belonging to a group if the activity patterns show them activate each time the array 105 processes specific IO requests. Further, the controller 230 can determine whether a resource/service 235/240 is 'hot' or 'cold,' as flagged by the monitor 220. Thus, in response to receiving an IO request that would generally cause the array 105 to activate those resources/services 235/340, the controller 230 can issue instructions for the array 105 to make the 'cold' resources/services 235/245 inactive, and the 'hot' resources/services 235/240 active.

In other embodiments, the controller 230 can establish a host-facing (HF) IO interface (e.g., application programming interface (API)) 205 based on its correlation between the IO workload model(s) and activity level model(s). For example, the controller 230 can provision the HF-API 205 with endpoints A1-n that pre-define array resources/services 235/240 required to process IO workloads 203 and their respective IO requests 207. Additionally, the controller 230 can establish an array-facing (AF) API 215 that includes AF-API endpoints B1-n corresponding to the HF-API endpoints A1-n. The AF-API endpoints B1-n can direct IO requests to one or more of the array's IO ports (e.g., ports 350 of FIG. 3) based on each IO request's required resources/services 235/240 and the receiving HF-API endpoint A1-n as described in greater detail below.

Figure 3:
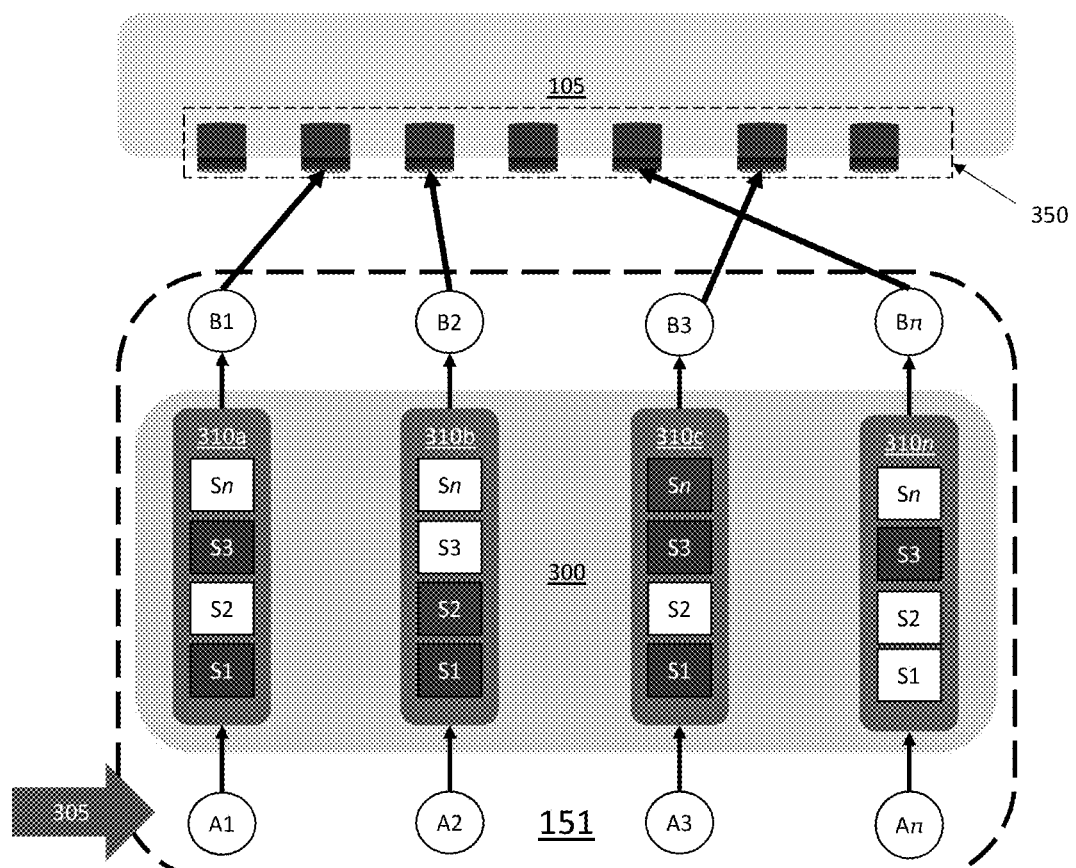
FIG. 3 is a block diagram of services related to corresponding actions in accordance with embodiments of the present disclosure.

Regarding FIG. 3, the resource manager 115 can include a host-facing API (HF-API) 205 that includes HF-API endpoints A1-n. The resource controller 230 can establish the HF-API endpoints A1-n with addresses to which the host(s) 114 can issue IO requests (e.g., IO request 207 of FIG. 2). For example, resource controller 230 can allocate the HF-API endpoints A1-n with IO processing resources 300, e.g., logical IO routing processors 310a-n to process their received IO requests. Furthermore, the controller 230 can provide the logical IO processors 310a-n with respective instruction blocks S1-n. Each instruction block S1-n can include resource/service allocation policies corresponding to a resource/service 235/240 required by each IO request. For example, each 'white' instruction block S1-n can include rules for activating a corresponding resource/service 235/245, while each 'black' instruction block S1-n can include rules for deactivating a corresponding resource/service 235/245. Accordingly, each HF-endpoint A1-n can append its received IO request with the rules defined by their respective instruction blocks S1-n.

Further, the controller 230 can dynamically issue each HF-endpoint A1-n with the instruction blocks S1-n based on the IO workload model(s), activity level model(s), snapshots/heatmaps, and the like. Specifically, the instruction blocks S1-n can include rules for activating the 'hot' resources/services 235/240 (e.g., those with activity levels above the first threshold) or relative importances above an importance threshold during a current or anticipated IO workload period. Further, the blocks S1-n can include rules for deactivating the 'cold' resources/services 235/240 (e.g., those with activity levels below the second threshold or relative importances below the importance threshold during the current or anticipated IO workload period.

In embodiments, the resource manager 115 can also include an AF-API 251 with AF-API endpoints B1-n. The controller 230 can map the AF-endpoints B1-n to one or more of the array's IO ports 350. Accordingly, the controller 230 can provide each AF-endpoints B1-n with their mapped port's destination address. Thus, upon receiving an IO request from, e.g., a corresponding HF-endpoint A1-n, the AF-endpoints can modify each IO's destination address to a target port's 350 address.

For example, the resource controller 230 can map each array port 350 to an AF-endpoint based on the IO workload models, activity level models, and the related information described above. Specifically, the models and related information can identify those ports associated with an array engine/board that includes an IO request's required resources/services 235/240 and is predicted to have sufficient bandwidth to satisfy host performance requirements during any given workload.

Accordingly, the controller 230 can dynamically send the array 105 a control signal 208 with port provisioning instructions. For example, the signal 208 can provide the array's HA (e.g., the HA 121 of FIG. 1) with instructions for configuring the ports 350. In addition, the instructions can define IO processing thread configurations for each port's mapped IO request types' required resources/services 230/245.

Further, the resource controller 230 can generate resources/services mappings that it broadcasts to the host(s) 114 via, e.g., the HF-API endpoints A1-n. The mappings can include endpoint addresses, enabling the hosts 114 to direct IO requests to specific HF-API endpoints A1-n based on each request's characteristics and resources/services requirements.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods described by this disclosure.

Figure 4:
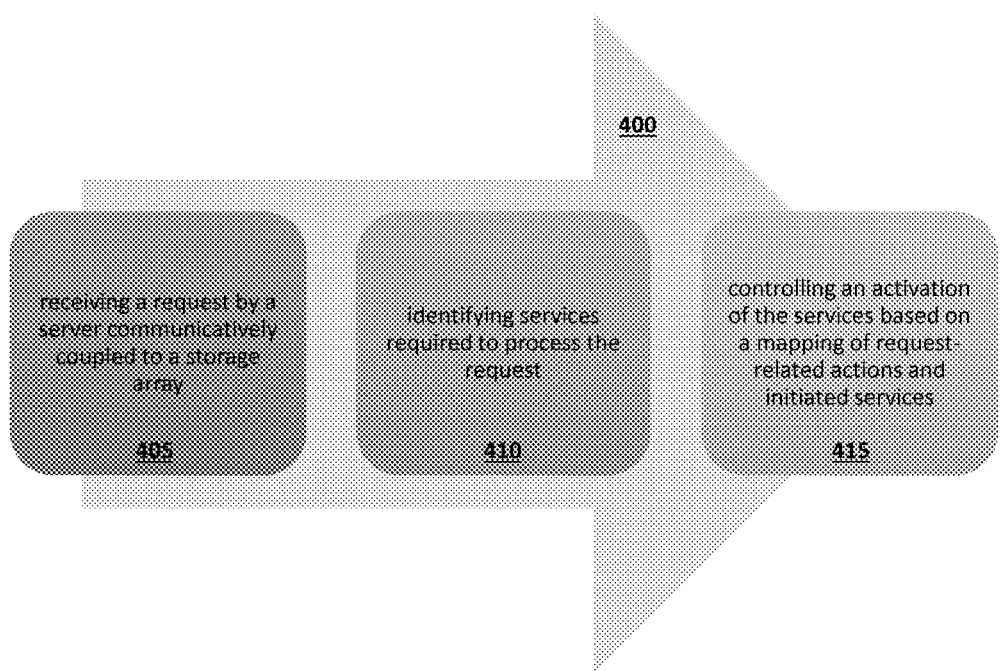
FIG. 4 is a flow diagram of a method for controlling service activation in accordance with embodiments of the present disclosure.

Regarding FIG. 4, one or more of the array's components (e.g., components 101 of FIG. 1) can execute the method 400. The method 400 describes an example flow that logically decouples grouped services to suspend or activate individual services in the group. At 405, the method 400 can include receiving a request by a server communicatively coupled to a storage array. The method 400, at 410, can also include identifying services required to process the request. At 415, the method 400 can further include controlling activation of the services based on a mapping of request-related actions and initiated services. It should be noted that each step of the method 400 can include any combination of techniques implemented by the embodiments described herein.

A skilled artisan can implement the above-described systems and methods in digital electronic circuitry, computer hardware, firmware, or software using the teachings disclosed herein. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for the execution of a computer program include, by way of example, both general and special purpose microprocessors and any one or more processors of any digital computer. Generally, a processor receives instructions and data from a read-only memory, a random-access memory, or both. Thus, for example, a computer's essential elements are a processor for executing instructions and one or more memory devices for storing instructions and data. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a remote server can interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations of elements.

One skilled in the art will realize that other specific forms can embody the concepts described herein without departing from their spirit or essential characteristics. Therefore, in all respects, the preceding embodiments are illustrative rather than limiting the concepts described herein. The appended claims thus recite the scope of this disclosure. Therefore, all changes embrace the meaning and range of equivalency of the claims.

What is claimed is:

1. A method comprising:
receiving a request by a server communicatively coupled to a storage array;
identifying services required to process the request;
collecting, by a resource monitor, telemetric data from daemons coupled to the services, wherein the daemons record activity levels of their respective resources and services in activity logs;
generating resource activity heatmaps based on the telemetric data by:
analyzing snapshots of the daemon activity logs according to a daemon reporting schedule, and
identifying resources and services having highest and lowest relative activity levels during snapshot windows;
establishing activity level thresholds based on the heatmaps by:
defining an activity level range from the highest and lowest relative activity levels, and
setting thresholds based on the activity level range and identified activity patterns;
wherein the resource monitor manages the daemons using a daemon control signal that defines a daemon reporting schedule based on identified workload patterns;
wherein a workload analyzer includes a machine learning engine that identifies patterns in IO workloads and generates predictive IO workload models; and
controlling the services' activation based on:
comparing service activity levels to the thresholds and a mapping of request-related actions and initiated services,
determining relative importance levels of the services, and
using a mapping of request-related actions and initiated services to selectively activate services having activity levels above a first threshold and deactivate services having activity levels below a second threshold, wherein the mapping includes host-facing API endpoints allocated with IO processing resources and corresponding instruction blocks that define rules for activating and deactivating services.

2. The method of claim 1, further comprising:
generating a resource mapping, defining relationships between the request-related actions and the services initiated to process the request-related actions; and
monitoring consumption and use of the services using the collected telemetric data.

3. The method of claim 2, further comprising:
collecting telemetric data from the server and storage array in response to receiving the request; and
analyzing the collected telemetric data.

4. The method of claim 3, further comprising:
monitoring consumption and use of one or more of the server and storage array resources to process the request using the collected telemetric data.

5. The method of claim 4, further comprising:
comparing one or more of the server and storage array resource consumptions to a threshold.

6. The method of claim 1, further comprising:
determining if one or more of the initiated services include grouped services, wherein each service of the grouped services is activated by default if any service of the group services is initiated.

7. The method of claim 6, further comprising:
determining whether each service of the grouped services is necessary to process the request-related actions.

8. The method of claim 6, further comprising:
logically decoupling the grouped services.

9. The method of claim 4, further comprising:
generating one or more service consumption models using the server and storage array resource mappings.

10. The method of claim 1, further comprising:
controlling service initiation based on one or more of the service consumptions models and the resource mappings, wherein controlling service initiation includes activating or suspending one or more services of one or more grouped services.

11. An apparatus including a memory and processor configured to:
receive a request by a server communicatively coupled to a storage array;
identify services required to process the request;
collect, by a resource monitor, telemetric data from daemons coupled to the services, wherein the daemons record activity levels of their respective resources and services in activity logs;
generate resource activity heatmaps based on the telemetric data by:
analyzing snapshots of the daemon activity logs according to a daemon reporting schedule, and
identifying resources and services having highest and lowest relative activity levels during snapshot windows;
establish activity level thresholds based on the heatmaps by:
defining an activity level range from the highest and lowest relative activity levels, and
setting thresholds based on the activity level range and identified activity patterns;
wherein the resource monitor manages the daemons using a daemon control signal that defines a daemon reporting schedule based on identified workload patterns;
wherein a workload analyzer includes a machine learning engine that identifies patterns in IO workloads and generates predictive IO workload models; and
control the services' activation based on;
comparing service activity levels to the thresholds and a mapping of request-related actions and initiated services,
determining relative importance levels of the services, and
using a mapping of request-related actions and initiated services to selectively activate services having activity levels above a first threshold and deactivate services having activity levels below a second threshold, wherein the mapping includes host-facing API endpoints allocated with IO processing resources and corresponding instruction blocks that define rules for activating and deactivating services.

12. The apparatus of claim 11, further configured to:
generate a resource mapping, defining relationships between the request-related actions and the services initiated to process the request-related actions; and
monitor consumption and use of the services using the collected telemetric data.

13. The apparatus of claim 12, further configured to:
collect telemetric data from the server and storage array in response to receiving the request; and
analyze the collected telemetric data.

14. The apparatus of claim 13, further configured to:
monitor consumption and use of one or more of the server and storage array resources to process the request using the collected telemetric data.

15. The apparatus of claim 14, further configured to:
compare one or more of the server and storage array resource consumptions to a threshold.

16. The apparatus of claim 11, further configured to:
determine if one or more of the initiated services include grouped services, wherein each service of the grouped services is activated by default if any service of the group services is initiated.

17. The apparatus of claim 16, further configured to:
determine whether each service of the grouped services is necessary to process the request-related actions.

18. The apparatus of claim 16, further configured to:
logically decouple the grouped services.

19. The apparatus of claim 14, further configured to:
generate one or more service consumption models using the server and storage array resource mappings.

20. The apparatus of claim 11, further configured to:
control service initiation based on one or more of the service consumptions models and the resource mappings, wherein controlling service initiation includes activating or suspending one or more services of one or more grouped services.

* * * * *